(No Model.)
H. S. PARK.
PNEUMATIC AND ELECTRIC CONTROLLED BRAKE.
No. 591,262. Patented Oct. 5, 1897.
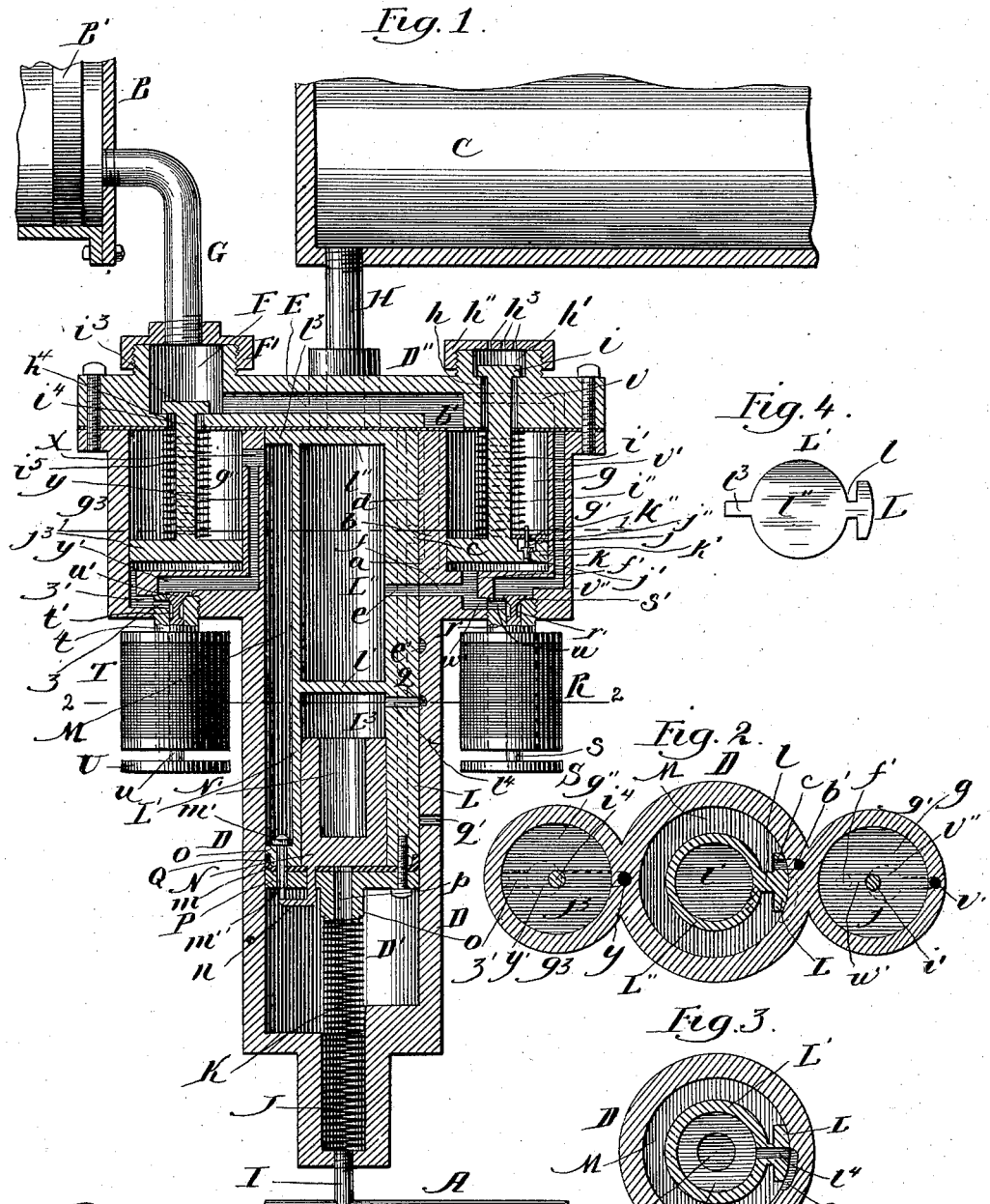
Witnesses:
Inventor:

UNITED STATES PATENT OFFICE.

HARVEY S. PARK, OF CHICAGO, ILLINOIS, ASSIGNOR TO THE WESTINGHOUSE AIR BRAKE COMPANY, OF ALLEGHENY COUNTY, PENNSYLVANIA.

PNEUMATIC AND ELECTRIC CONTROLLED BRAKE.

SPECIFICATION forming part of Letters Patent No. 591,262, dated October 5, 1897.

Original application filed November 28, 1887, Serial No. 256,352. Divided and this application filed July 2, 1888. Serial No. 278,991. (No model.)

*To all whom it may concern:*

Be it known that I, HARVEY S. PARK, a citizen of the United States, residing at Chicago, in the county of Cook and State of Illinois, have invented a certain new and useful Improvement in Pneumatic and Electric Controlled Brakes, of which improvement the following is a specification.

The object of my invention is to provide an improvement in fluid-pressure-brake apparatus; and to this end my invention consists of means whereby the brakes may be applied or released and the application or release controlled at will by the operation of electrically or pneumatically controlled devices, in the combination of the electrically and pneumatically controlled devices whereby the application, release, and graduation of the brake-pressure may be effected by the pneumatically or electrically controlled devices either independently or conjointly, and in certain combinations and constructions, all as hereinafter fully set forth.

In the accompanying drawings, which illustrate an application of my invention, Figure 1 is a central longitudinal section through the casing of a triple-valve device and through the electrically - controlled induction and eduction valve devices, the casing of the triple-valve and electrically-controlled devices being shown connected to the auxiliary reservoir and brake-cylinder, parts of which are shown in section; Fig. 2, a section on the line 1 1 of Fig. 1; Fig. 3, a section through the casing on the line 2 2 of Fig. 1, and Fig. 4 a plan view of the upper end of the main valve.

So far as I am aware no fluid-pressure brake apparatus has been devised in which the brakes, whether applied by fluid-pressure or electric controlling devices, or both, may be released at will by means of electric or fluid-pressure-actuated controlling devices, adapted to be operated either concurrently or separately and at different times.

One of the objects of my invention is to provide means whereby the brakes may be applied and released by fluid-pressure and electric controlling devices, operated at will, either separately or concurrently.

By the employment of the electric controlling devices the instant and simultaneous application of the brakes on all the cars in a train may be effected and the shocks incident to the slower action of the fluid-pressure controlling devices are prevented. These advantages are obtained both in service and emergency applications of the brakes and the pressure in the brake-cylinders may be graduated, both in applying and releasing the brakes, to any desired degree.

The combination of the electric controlling devices with fluid-pressure controlling devices in the same system and their capacity for separate and independent operation greatly increases the certainty and safety of the brake apparatus as a whole.

One of the difficulties heretofore existing and preventing the employment of electric controlling devices in combination with an automatic fluid-pressure brake system has been the failure to successfully control the release of fluid under pressure from the brake-cylinder. My improvement provides means whereby the release of fluid from the brake-cylinder is controlled by a valve which is normally closed or adapted to be closed by the action of fluid under pressure which is admitted to the cylinder, so that if the valve is not already closed the operation of the electric devices or of the fluid-pressure controlling devices in admitting fluid under pressure to the brake-cylinder will effect the closing of the brake-cylinder exhaust-port, and by means of my improvement the exhaust-port may be opened to release fluid from the brake-cylinder by means of either the electric or the fluid-pressure controlling devices.

As shown in the drawings, the train-pipe A is connected with one end of the casing D of the triple-valve device by means of a branch pipe I, through which fluid under pressure is supplied to a chamber D'. The other end of the casing D is provided with a cap D'', and a pipe H, which is connected with an opening in the cap D'' (shown in dotted lines in Fig. 1) and with the auxiliary reservoir C, forms a passage from the chamber D' to the auxiliary reservoir. A passage b in the casing D, provided with lateral ports $d$ and $a$, opens near the upper end of the casing into a port $b'$, which is connected by means of a passage E with a chamber F in the cap D''. The chamber F is closed by a screw-cap F' and is connected with the brake-cylinder B by means of a pipe G, the cylinder B being provided with a piston B', as usual.

The main valve L in the chamber D' is connected to a tube or stem L', within which are the chambers L'' and L³, which are separated from each other by a partition $l'$. The upper end of the chamber L'' is closed by the integral cover $l''$, and a projection $l^3$, extending from the cover $l''$ into contact with the wall of the chamber D', forms a guide for the stem of the main valve.

The hollow stem L' of the main valve L is provided at its lower end with a flange O, between which and a disk P is clamped a packing Q of suitable material, the parts O, P, and Q forming a piston exposed on one side to auxiliary-reservoir pressure and on the other side to train-pipe pressure. A passage $m$ through the piston is controlled by a small non-return valve $m'$, which permits the passage of fluid from the train-pipe into the space M surrounding the stem L', and thence to the auxiliary reservoir, but prevents its return to the train-pipe.

A passage $c$ is formed through the valve L in position to register with the port $a$ in service applications, so as to connect the space M and the auxiliary reservoir with the passage $b$, and through the port $b'$, passage E, chamber F, and pipe G with the brake-cylinder.

A passage $e$ extends from the chamber L'' of the stem L' to the face of the valve L, and when the valve L is in its normal position, as shown in Fig. 1, the passage $e$ registers with a passage $f$ in the wall of the casing D. The passage $f$ is connected by means of a port $f'$ with one end of a chamber $g$, formed in an extension $g'$ of the main casing D, and the other end of the chamber $g$ communicates with the passages $b$ and E through the port $b'$. An eduction or exhaust passage $h$ leads from the chamber $g$ through the cap D'' into a chamber $h'$, which is open to the atmosphere through the passages $h^3$ in the cap $h''$. An eduction or exhaust valve $i$, which is normally closed, controls the passage $h$ and is connected by means of a stem $i'$ to a piston $j$ in the chamber $g$. The stem $i'$ is surrounded by a light spring $i''$, which assists in effecting a quick closing of the valve $i$, but which is not essential to the operation of the valve $i$ and may be dispensed with. With or without the spring $i''$ the valve $i$ will be closed and held closed when the brakes are applied by fluid-pressure in the chamber $g$ acting on the piston $j$.

A passage $j'$ in the piston $j$ is controlled by a valve $k$, located in a chamber $j''$ in the piston, and a stem $k'$ on the valve $k$ passes through and is guided by a bar $k''$, secured in place over the chamber $j''$.

A passage $v$ in the cap D'' (shown in dotted lines in Fig. 1) leads from the passage E and is connected by a passage $v'$ in the wall of the casing $g'$ with a chamber $v''$, in which is located a valve $s'$. The stem $s$ of the valve $s'$ passes through the core $r$ of an electromagnet R and is connected to the armature S of the magnet R. The core $r$ is screw-threaded into the casing $g'$ and is provided with a passage $w$, which communicates with the passages $w'$, $f$, and $f'$ in the casing $g'$. The valve $s'$ controls communication between the chamber $v''$ and the passage $w$, and the stem of the valve $s'$ is so fitted in the passage through the core $r$ as to permit the passage of fluid under pressure around it in limited quantity.

A chamber $g''$ is formed in a casing $g^3$ or an extension of the main casing D, and a passage $h^4$, controlled by an induction-valve $i^3$, connects the chamber $g''$ with the chamber F when the valve $i^3$ is unseated. The valve $i^3$ is normally closed and is connected by means of a stem $i^4$ to a piston $j^3$. The stem $i^4$ is surrounded by a spring $i^5$, which tends to close the induction-valve $i^3$.

A passage $x$ in the main casing connects the chamber $g''$ with the space M, surrounding the stem L' of the main valve, and with the auxiliary reservoir, and a passage $y$ leads from the passage $x$ to a chamber $y'$, in which an electrically-operated valve $u'$ is located. The stem $u$ of the valve $u'$ is so fitted in the passage $t'$, formed in the core $t$, as to permit a limited flow of fluid through the passage $t'$, and the lower end of the stem $u$ is connected to an armature U, which is attracted to the core when a current is passed through the coil T. A lateral passage $z$ in the core $t$ connects the passage $t'$ with a passage $z'$, leading to that part of the chamber $g''$ below the piston $j^3$.

When the train-pipe is charged with fluid under pressure and the brakes are released, the parts occupy the positions shown in the drawings. Fluid under pressure is supplied from the train-pipe to the auxiliary reservoir through the passage $m$ in the triple-valve piston, through the space M around the stem L', and through the pipe H.

The spring K tends to hold the triple-valve piston and the main valve in their normal positions, and this spring K is what may be called a "three-power" spring—that is, a spring formed of three parts, connected together or formed integral with one another, each of the parts being formed or adjusted to offer more or less resistance to compression than the two other parts. In my improvement that part or section of the spring which is next to the piston may be more easily compressed than the two other parts. The second or middle part or section offers a greater resistance to compression, but not so much as the other end portion, which bears on the casing. The spring when so formed may be reversed, so that its weaker portion bears on the casing and its most rigid portion bears on the piston, and its function will not be affected thereby. An equivalent for such a spring is the well-known arrangement of three separate springs of different resistances, which have been employed for a similar purpose.

When it is desired to operate by means of the fluid-pressure-controlling devices only, a service application of the brakes may be effected by a comparatively slight or gradual reduction of train-pipe pressure, such as will permit the auxiliary-reservoir pressure to overcome the train-pipe pressure and the pressure of the spring K sufficiently to move the main valve and bring the port $c$ in the main valve into position to register with the port $a$ in the casing. Fluid under pressure will then pass from the space M and from the auxiliary reservoir through the ports $c$ and $a$ and through the passage $b$, port $b'$, passage E, chamber F, and pipe G to the brake-cylinder and apply the brakes. At the same time, since the chamber $g$ is in communication with the passages $b$ and E through the port $b'$, that portion of the chamber $g$ above the piston $j$ will be charged with fluid under pressure, and the valve $i$ will be held to its seat by the fluid-pressure acting on the upper side of the piston $j$ and by the pressure of the spring $i''$ if such spring be employed. If, on account of the absence of the spring $i''$ or for any other reason, the valve $i$ should be open at the beginning of an application of the brakes, it will be closed by the fluid-pressure acting on the upper side of the piston $j$.

When the auxiliary-reservoir pressure has been sufficiently reduced by expansion into the brake-cylinder, the triple-valve piston and the main valve L will be returned to their normal positions. The return movement of the main valve will cut off communication between the auxiliary reservoir and the brake-cylinder, but will have no effect on the exhaust-valve $i$, which will remain closed until it is opened by the means and in the manner to be hereinafter described. If it is desired to increase the pressure in the brake-cylinder, a further slight or gradual reduction of train-pipe pressure will cause the port $c$ in the valve L to again register with the port $a$ in the casing and fluid under pressure will again flow from the auxiliary reservoir to the brake-cylinder. In order to release the brakes, such a reduction of train-pipe pressure is necessary as will cause the main valve L to be moved far enough to bring the port $e$ into position to register with a passage $e'$ in the wall of the casing D, which at all times communicates with the space M around the stem $L'$ and through the space M and pipe H with the auxiliary reservoir. When the port $e$ registers with the passage $e'$, the chamber $L''$ will be charged with fluid under pressure from the auxiliary reservoir; and if the train-pipe pressure be increased sufficiently to return the valve L to its normal position, in which position the port $e$ registers with the passage $f$, the fluid under pressure in the chamber $L''$ will flow through the passages $e$, $f$, and $f'$ into the chamber $g$ below the piston, and since this pressure on the under side of the piston $j$ is never less than and may be greater than the pressure on the other side of the piston $j$ the fluid-pressure acting on the valve $i$ and on the lower side of the piston $j$ in one direction will overcome the pressure acting on the other side of the piston $j$ in the opposite direction, and the valve $i$ will be unseated, thereby permitting the fluid under pressure in the brake-cylinder to escape to the atmosphere through the passage $h$, chamber $h'$, and passages $h^3$.

The capacity of the passages $e$, $f$, and $f'$ is made greater than the capacity of the passage around the stem $s$ in order to obtain the necessary pressure below the piston $j$ when the chamber $L''$ is put in communication with the chamber $g$, back of the piston $j$, for the purpose of releasing the brakes by means of the fluid-pressure-controlling devices only.

As the pressure in the brake-cylinder reduces in releasing the brakes, the fluid under pressure below the piston $j$ will tend to equalize with that on the other side by flowing through the passage $j'$ controlled by the valve $k$, and the fluid under pressure in the chamber $L''$ and the space below the piston $j$, when the brake-cylinder is emptied, will escape to the atmosphere through the passage $j'$, chamber $g$, and exhaust-passage $h$.

An emergency application of the brakes may be effected by such a reduction of train-pipe pressure as will cause the valve L to move suddenly to the limit of its stroke, in which the end of the valve L will uncover the comparatively large port $d$ and permit a rapid flow of fluid from the auxiliary reservoir to the brake-cylinder, and the valve L may thereafter be returned to its normal position without releasing the brakes.

When it is desired to apply the brakes by means of the electric controlling devices, a current is passed through the coil T, which is connected with a circuit extending throughout the train, the armature U is attracted to the lower end of the core $t$ and closes the end of the passage therethrough, the valve $u'$ is unseated, and fluid under pressure flows from the space M and from the auxiliary reservoir through the passage $y$, chamber $y'$, and passages $z$ and $z'$ into the chamber $g''$ below the piston $j^3$, or it may be said that the unseating of the valve $u'$ permits an equalization of the pressures above and below the piston $j^3$—that is, in degree or an equalization of the pressure per unit of area above and below the piston $j^3$. The fluid-pressure acting on the valve $i^3$ and on the under side of the piston $j^3$ in one direction will then overcome the pressure acting on the piston $j^3$ in the opposite direction and the valve $i^3$ will be unseated. The unseating of the valve $i^3$ will permit fluid under pressure to flow from the space M and from the auxiliary reservoir through the passage $x$, chamber $g''$, passage $h^4$, chamber F, and pipe G to the brake-cylinder, and fluid under pressure flowing through the passage E and port $b'$ to the chamber $g$ will act on the upper side of the piston $j$ and hold the exhaust-valve $i'$ to its seat. When the electric current ceases, the armature U will be released, and by its downward movement will close the valve $u'$ and open the end of the passage $t'$ through the core $t$, thereby permitting the release of fluid under pressure from the lower side of the piston $j^3$ through the passages $z'$, $z$, and $t'$ around the stem $u$. The pressure above the piston $j^3$ will then move the piston $j^3$ down and close the valve $i^3$. This operation may be repeated as often as desired, or until the auxiliary reservoir and brake-cylinder pressures have equalized.

After the brakes have been applied, either by the electric or fluid-pressure controlling devices, they may be released, as already described, by the fluid-pressure controlling devices or by the electric releasing devices.

To release the brakes by means of the electric releasing devices, a current is passed through the coil R, which is connected with a circuit extending throughout the train, the armature S is attracted to the core $r$ and closes the lower end of the passage $r'$ through the core, the valve $s'$ is unseated, and fluid under pressure is admitted to the under side of the piston $j$ through the passages $v$, $v'$, $v''$, $w$, $w'$, and $f'$ until the pressure below the piston $j$ is the same in degree as that above it. The pressure acting on the valve $i$ and on the lower side of the piston $j$ in one direction will then overcome the pressure acting on the piston in the other direction and the valve $i$ will be unseated, thereby permitting the release of fluid from the brake-cylinder through the pipe G, chamber F, passage E, port $b'$, chamber $g$, and passage $h$ to the atmosphere. The stoppage of the electric current will permit the release of the armature S and the closing of the valve $s'$, which will put the space below the piston $j$ in communication with the atmosphere through the passages $f'$, $w'$, $w$, and $r'$, and the reduction of pressure below the piston $j$ will permit the pressure above it to close the valve $i$ and cut off the exhaust from the brake-cylinder. If the exhaust-valve $i$ is allowed to remain open until the pressure is completely exhausted from the brake-cylinder, the pressure below the piston $j$ may be released by the stoppage of the current, as described, or if the current continues the pressure below the piston $j$ may escape through the passage $j'$ in the piston and through the chamber $g$ and passage $h$.

Through the central projection $o$ on the piston of the triple-valve device is formed a passage $p$, through which fluid under pressure is admitted to the under side of a piston N, which is fitted in the chamber $L^3$ and provided with a chamber $N'$. An arm $n$, connected to the piston N, is located in position to come in contact with the stem $m''$ of the valve $m'$ and to unseat the valve $m'$ when the piston N is moved upward in the chamber $L^3$. The upper end of the chamber $L^3$ is provided with a port $l^4$, which, when the main valve is in its normal position, registers with a passage $q$, opening into the space M, through which auxiliary-reservoir pressure is admitted to the upper side of the piston N to hold the piston N down to its seat on the gasket Q.

When the main valve L and its piston are moved down far enough in applying the brakes, the passage $l^4$, leading from chamber $L^3$, will register with an exhaust-passage $q'$ in the casing D and the fluid under pressure in the chamber $L^3$ above the piston N will escape to the atmosphere, thereby permitting the train-pipe pressure below the piston N to move that piston upward. The upward movement of the piston N will bring the arm $n$ in contact with the stem of the valve $m'$ and the valve $m'$ will be unseated and permit fluid under pressure to pass through the passage $m$. This piston N and its combination with other parts forms no part of my present invention, but forms part of the subject-matter of another application, of which this application is a division, filed by me November 28, 1887, Serial No. 256,352, and is therefore not claimed herein.

It will be obvious from the construction shown in the drawings that the electrically-operated induction-valve may be opened simultaneously with the operation of the main valve to charge the brake-cylinder or at any time during or after the charging of the brake-cylinder by the main valve if the operation of the electric devices controlling the separate induction-valve is effected before the equalization of the auxiliary-reservoir and brake-cylinder pressures. It will also be seen that the simultaneous operation of the electric controlling devices for the eduction or exhaust valve and the operation of the main valve for opening the exhaust may be effected with advantage, particularly toward the end of the operation of exhausting from the brake-cylinder, when the opening of the valve $s'$ will insure substantially the same pressure below the piston $j$ as exists above it.

I claim as my invention and desire to secure by Letters Patent—

1. In a fluid-pressure brake apparatus, the combination, with a train-pipe, and a brake-cylinder, of a valve device operated by variations of fluid-pressure to apply and release the brakes, a normally-closed exhaust port, or passage, and electrical controlling devices, whereby the exhaust port or passage may be alternatively controlled by the fluid-pressure-operated valve device or by the electrical controlling devices.

2. In a fluid-pressure brake apparatus, the combination, with a train-pipe, and a brake-cylinder, of a main valve operated by variations of fluid-pressure, electrical controlling devices, and a normally-closed exhaust port, or passage, adapted to be controlled alternatively by the main valve or the electrical controlling devices, substantially as set forth.

3. In an air-brake system, the combination, of a train-pipe, a brake-cylinder, an auxiliary reservoir, a main valve operated by variations of fluid-pressure, a normally-closed exhaust-port, a separate induction-valve normally closed, and electric devices for operating the separate induction-valve, whereby fluid under pressure may be supplied to the brake-cylinder by the operation of the main valve or the separate induction-valve, substantially as set forth.

4. In an air-brake system the combination of a train-pipe, a brake-cylinder, a car-reservoir, a main valve operative by variations of fluid-pressure and controlling the induction and eduction of air to and from the brake-cylinder, separate induction and eduction valves, and electrical devices for operating them independent of the main valve, substantially as set forth.

5. In an air-brake system, the combination of a train-pipe, a brake-cylinder, an auxiliary reservoir, an eduction-port normally closed, and independent pneumatic and electric devices controlling the valve for the eduction-port, substantially as and for the purposes specified.

6. In an air-brake system, the combination of a train-pipe, a brake-cylinder, an auxiliary reservoir, a normally-closed eduction-port, a normally-closed induction-port, and independent electric pneumatic devices controlling the valves of the eduction and induction ports, substantially as and for the purposes specified.

7. In an air-brake system the combination of a brake-cylinder, an eduction-passage from the brake-cylinder, a valve for such eduction-passage normally closed, a piston controlling said valve, a passage from the brake-cylinder to the back of the piston, a valve for such passage and electric devices for controlling such valve, substantially as set forth.

8. In an air-brake system the combination of a train-pipe, a brake-cylinder, an auxiliary reservoir, a chamber communicating with the train-pipe, brake-cylinder and car-reservoir, a second chamber connected with the main chamber and the brake-cylinder, an eduction-passage in said second chamber, a valve controlling said eduction-passage, a piston attached to the valve and located in the chamber, a passage leading from the main chamber below the piston, a passage leading from the brake-cylinder below the piston, a valve electrically controlled for said last-named passage, and a main pneumatic valve, substantially as and for the purposes specified.

9. In an air-brake system, the combination of a train-pipe, a brake-cylinder, a car-reservoir, a chamber communicating with the train-pipe, brake-cylinder and car-reservoir, a main pneumatic valve in said chamber, a chamber communicating with main chamber and the brake-cylinder, an eduction-passage in said chamber, a valve for said eduction-passage, a piston in the eduction-chamber carrying the valve, passages leading to the eduction-chamber from the main chamber and the brake-cylinder, an electric-controlled valve for such brake-cylinder passage, another chamber communicating with the main-valve chamber, an induction-port from such chamber, a valve normally closed for such induction-port, a piston in the chamber carrying said valve, a passage leading from its main-valve chamber to the chamber last named back of the piston and an electric-controlled valve for the last-named passage, substantially as and for the purposes specified.

10. In an air-brake system the combination of a main valve and a brake-cylinder, an eduction-passage from the brake-cylinder, an eduction-valve controlling such passage and a passage controlled by the main valve for admitting air to the piston of the eduction-valve when the main valve is in release position, whereby the eduction-valve is opened to release the brakes, substantially as set forth.

11. In an air-brake system the combination with a main valve and a brake-cylinder of an eduction-passage from the brake-cylinder, an eduction-valve controlling said passage and operated by a piston, a chamber containing fluid under pressure for causing the opening of the eduction-valve, and a passage controlled by the main valve and leading from said chamber to the piston of the eduction-valve, substantially as set forth.

12. In an air-brake system the combination of a brake-cylinder passage, a main-valve chamber, an eduction-chamber communicating with the brake-cylinder passage, a passage leading from the eduction-chamber, a valve normally closed for said passage, a piston in the eduction-chamber for controlling the eduction-valve, a passage in the chamber below the piston, passage connecting the main-valve chamber and the brake-cylinder passage with the passage into the chamber back of the piston, a main pneumatic valve, and electric devices, for controlling the eduction-port, substantially as specified.

13. In an air-brake system, the combination of a brake-cylinder, a main chamber, a passage communicating with the brake-cylinder and the main chamber, an eduction-chamber communicating with the brake-cylinder passage, a passage leading from the eduction-chamber to the atmosphere, a valve normally closed for said passage, a piston controlling said valve, a passage leading to the chamber back of the piston, and communicating with the main pneumatic valve-chamber and the brake-cylinder passage, a main pneumatic valve, and electrical devices for controlling the normally-seated valve of the eduction-passage, substantially as specified.

14. In an air-brake system the combination of a train-pipe, a brake-cylinder, a car-reservoir, a chamber communicating with the train-pipe and car-reservoir, a passage communicating with the main chamber and brake-cylinder, an eduction-chamber communicating with the brake-cylinder passage, a passage leading from the eduction-chamber to the atmosphere, a valve normally closed for said passage, a piston operating said valve, a passage leading to the eduction-chamber, below the piston and communicating with the brake-cylinder passage and the main chamber, a main pneumatic valve and devices electrically controlled for opening the eduction-port, substantially as specified.

15. In an air-brake system, the combination of a train-pipe, a brake-cylinder, a car-reservoir, a chamber communicating with the train-pipe and car-reservoir, a passage communicating with the chamber and brake-cylinder, an eduction-chamber communicating with the brake-cylinder passage leading from the eduction-chamber to the atmosphere, a valve normally closed for said passage, a piston in the eduction-chamber operating the valve, a passage into the eduction-chamber below the piston and communicating with the brake-cylinder passage and the main chamber, a main pneumatic valve, a piston for said valve having a refilling-passage with a downwardly-seated valve, and devices electrically operated to open the eduction-valve, substantially as and for the purposes specified.

16. In an air-brake system, the combination of a passage communicating with the brake-cylinder and chamber for the main pneumatic valve, an induction-chamber communicating with the brake-cylinder passage, and the main-valve chamber, a valve normally seated for the passage from the induction-chamber to the brake-cylinder passage, a device electrically controlling said induction-valve, and a main valve, substantially as and for the purposes specified.

17. In an air-brake system the combination of a passage communicating with a brake-cylinder and a main-valve chamber, an induction-chamber communicating with the main-valve chamber and the brake-cylinder passage, a main pneumatic valve, a normally-closed induction-valve, a piston operating the induction-valve, and devices electrically operated, controlling the piston for opening the induction-port, substantially as specified.

18. In an air-brake system the combination of a passage communicating with the brake-cylinder and main-pneumatic-valve chamber, an induction-chamber communicating with the brake-cylinder passage and the main-valve chamber, a normally-closed valve for the passage from the induction-chamber to the brake-cylinder passage, a piston controlling said valve, a passage from the main-valve chamber to the induction-chamber back of the piston, a valve electrically controlled for said passage, and a main pneumatic valve, substantially as and for the purposes specified.

19. In an air-brake system, the combination of a passage communicating with the brake-cylinder and main-pneumatic-valve chamber, an eduction-chamber communicating with said passage, a passage from the eduction-chamber, a valve normally closed for said passage, a piston operating said valve, a passage leading to the eduction-chamber back of the piston, a passage from the main chamber to said passage, a passage from the brake-cylinder passage to said passage, a valve controlling said last-named passage electrically operated, and a main valve, substantially as specified.

20. In an air-brake system, the combination of a passage communicating with the brake-cylinder and main-pneumatic-valve chamber, an eduction and an induction chamber, communicating with the said passage, and valves normally closed for the eduction and induction chambers, one operated pneumatically and electrically and the other electrically, substantially as specified.

21. In an air-brake system, the combination of a passage communicating with the brake-cylinder and main-pneumatic-valve chamber, an eduction and an induction chamber communicating with the said passage, valves normally closed for said chambers, and pistons in said chambers, operating the valves, electropneumatically, substantially as specified.

22. In an air-brake system, the combination of a passage communicating with the brake-cylinder, main-pneumatic-valve chamber, and eduction and induction chambers, a main valve, valves for the eduction and induction chambers, pistons operating said valves, passages to the eduction and induction chambers back of the piston, and valves controlling said passages electrically operated, substantially as specified.

23. In an air-brake system, the combination of a passage communicating with a brake-cylinder, a main-pneumatic-valve chamber, and eduction and induction chambers, a main valve, a piston actuating the main valve, a train-pipe, a brake-cylinder, a car-reservoir, normally-closed valves for the eduction and induction chambers, pistons for actuating said valves, passages leading to the chambers back of the pistons, passages connecting the main chamber with the piston-chamber passage back of the piston, a passage connecting the brake-cylinder passage with the passage to the eduction-chamber back of the piston, and valves electrically controlled, substantially as and for the purposes specified.

24. In an air-brake system, the combination of a train-pipe, a brake-cylinder, a car-reservoir, a chamber communicating with the train-pipe and car-reservoir, a valve in said chamber, a piston-stem carrying the valve, and having a chamber formed in it and closed at its ends, with a release-port therefrom, and a filling-port therefor in the main chamber, and a valve device operated by fluid from the release-port, substantially as and for the purposes specified.

25. In an air-brake system, the combination of a train-pipe, a brake-cylinder, a storage-reservoir, a chamber communicating with the train-pipe and storage-reservoir, a piston in said chamber, a piston-stem having a chamber closed at its ends, a main pneumatic valve carried by the stem, a port in said valve, a passage from the stem-chamber through the valve, a grading-port from the main chamber coacting with the valve-port, a by-pass in the chamber and passage from the chamber coacting with passage for the stem-chamber, for applying a grading pressure and releasing the brakes, substantially as specified.

26. In an air-brake system, the combination of a train-pipe, a brake-cylinder, a car-reservoir, a chamber communicating with the train-pipe and car-reservoir, a piston in said chamber, a stem for the piston having a chamber closed at its ends, a main valve carried by the piston, a grading-port in the valve, a release-passage from the chamber of the piston-stem, a grading-port from the main chamber, a filling-port from the main chamber for the stem-chamber, a release-port from the main chamber, a second chamber connected with the release-port of the main chamber, a piston in said last-named chamber, a valve carried by the piston, and an eduction-passage normally closed by said valve, for applying the brakes with a grading pressure, and venting the brake-cylinder to release the brakes, substantially as specified.

27. In an air-brake system a main-valve casing, a main valve sliding therein, a chamber connected to and movable with the valve and a port in the chamber for registering with ports in the main-valve casing whereby the chamber may be charged with air in one position and this air released when the chamber is in another position for the purpose of operating a second valve, substantially as specified.

28. In an air-brake system a main-valve casing with connections to the train-pipe, auxiliary reservoir, and brake-cylinder, a main valve in the casing for controlling the brake-cylinder and auxiliary-reservoir connections, a closed chamber in the casing connected to and movable with the main valve and a port in the movable chamber for registering with ports in the casing whereby the movable chamber may be filled with compressed air and the air released therefrom to operate a second valve, substantially as described.

29. In an automatic air-brake system, a main valve for controlling communication between the train-pipe, auxiliary reservoir, and brake-cylinder, a separate eduction-valve operated by air-pressure supplied through the main valve, substantially as described.

30. In an automatic air-brake system, the combination of a train-pipe, auxiliary reservoir, and brake-cylinder, of a main valve and a separate eduction-valve which is held closed by brake-cylinder pressure and opened by auxiliary-reservoir pressure.

31. In an automatic air-brake system, the combination with a train-pipe, an auxiliary reservoir and a brake-cylinder of a main valve operated by variations in the train-pipe pressure and controlling communication between the auxiliary reservoir and the brake-cylinder, and a separate eduction-valve opened and closed by brake-cylinder pressure.

32. In an automatic air-brake system, the combination with a train-pipe, an auxiliary reservoir, and a brake-cylinder of a main valve operated by variations in the train-pipe pressure and controlling communication between the auxiliary reservoir and the brake-cylinder, and a separate eduction-valve opened and closed by brake-cylinder pressure controlled by an electrically-operated valve, substantially as described.

HARVEY S. PARK.

Witnesses:
O. W. BOND,
H. B. HALLOCK.